US012561878B2

(12) United States Patent
Oh et al.

(10) Patent No.: US 12,561,878 B2
(45) Date of Patent: Feb. 24, 2026

(54) TEXT-DRIVEN MOTION RECOMMENDATION AND NEURAL MESH STYLIZATION SYSTEM AND A METHOD FOR PRODUCING HUMAN MESH ANIMATION USING THE SAME

(71) Applicant: POSTECH RESEARCH AND BUSINESS DEVELOPMENT FOUNDATION, Pohang-si (KR)

(72) Inventors: Tae Hyun Oh, Pohang-si (KR); You Wang Kim, Pohang-si (KR); Ji Yeon Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 137 days.

(21) Appl. No.: 18/440,889

(22) Filed: Feb. 13, 2024

(65) Prior Publication Data

US 2024/0273798 A1　　Aug. 15, 2024

(30) Foreign Application Priority Data

Feb. 13, 2023　(KR) ........................ 10-2023-0018505
Oct. 17, 2023　(KR) ........................ 10-2023-0139071

(51) Int. Cl.
　　*G06T 13/40*　　　(2011.01)
　　*G06F 40/30*　　　(2020.01)
　　　　(Continued)

(52) U.S. Cl.
　　CPC .............. *G06T 13/40* (2013.01); *G06F 40/30* (2020.01); *G06T 15/04* (2013.01); *G06T 17/20* (2013.01);
　　　　(Continued)

(58) Field of Classification Search
　　CPC ......... G06T 15/04; G06T 13/40; G06T 17/20; G06T 19/20; G06T 2219/2024;
　　　　(Continued)

(56) References Cited

U.S. PATENT DOCUMENTS 12,340,480　B2 *　6/2025　Zhi ........................ G06N 3/094
2024/0193891　A1 *　6/2024　Markhasin .............. G06T 19/20
　　　　(Continued)

FOREIGN PATENT DOCUMENTS

EP　　　　4379666　A1 *　6/2024　............. G06T 17/20

OTHER PUBLICATIONS

Hong F, Zhang M, Pan L, Cai Z, Yang L, Liu Z. Avatarclip: Zero-shot text-driven generation and animation of 3d avatars. arXiv preprint arXiv:2205.08535. May 17, 2022. (Year: 2022) (Year: 2022) (Year: 2022) (Year: 2022) (Year: 2022).*

(Continued)

*Primary Examiner* — Phu K Nguyen

(57) ABSTRACT

The present disclosure provides a text-driven motion recommendation and neural mesh stylization system and a method producing human mesh animation using the same. The system comprises at least one instruction stored in a memory, and a processor that executes the at least one instruction, wherein the at least one instruction, when executed by the processor, causes the processor to find raw action labels matching a query given as a text prompt in a human motion dataset stored in a database, encode the raw action labels and the query for vectorizing the raw action labels and the query, and measure similarity between the raw action labels and the query based on the vectorized vectors.

16 Claims, 12 Drawing Sheets

(51) Int. Cl.

| | |
|---|---|
| *G06T 15/04* | (2011.01) |
| *G06T 17/20* | (2006.01) |
| *G06T 19/20* | (2011.01) |

(52) U.S. Cl.
CPC ...... *G06T 19/20* (2013.01); *G06T 2219/2012* (2013.01); *G06T 2219/2024* (2013.01)

(58) Field of Classification Search
CPC .. G06T 2219/2012; G06N 3/045; G06N 3/08; G06F 40/30
USPC ......................................................... 345/418
See application file for complete search history.

(56) References Cited

U.S. PATENT DOCUMENTS

| | | | | |
|---|---|---|---|---|
| 2024/0242452 A1* | 7/2024 | Zhi | ........................ | G06N 3/094 |
| 2024/0273798 A1* | 8/2024 | Oh | .......................... | G06T 15/04 |
| 2025/0157114 A1* | 5/2025 | Yuan | ....................... | G06T 13/40 |
| 2025/0166664 A1* | 5/2025 | Karim | .................... | G06F 40/40 |

OTHER PUBLICATIONS

Patashnik O, Wu Z, Shechtman E, Cohen-Or D, Lischinski D. Styleclip: Text-driven manipulation of stylegan imagery. InProceedings of the IEEE/CVF international conference on computer vision 2021 (pp. 2085-2094).*

Youwang K, Ji-Yeon K, Oh TH. CLIP-Actor: Text-Driven Recommendation and Stylization for Animating Human Meshes. arXiv preprint arXiv:2206.04382. Jun. 9, 2022.*

Hong, Fangzhou, et al. "AvatarCLIP: Zero-shot text-driven generation and animation of 3D avatars." arXiv preprint arXiv:2205.08535 (May 17, 2022.).

Korean Office Action in Application No. 10-2023-0139071, dated Jul. 28, 2025, 6 pages.

Radford, Alec et al, Learning Transferable Visual Models From Natural Language Supervision, arXiv preprint, Feb. 26, 2021, arXiv:2103.00020, arXiv.

Song, Kaitao, et al, MPNet: Masked and Permuted Pre-training for Language Understanding, arXiv preprint, Nov. 2, 2020, arXiv:2004.09297, arXiv.

Michel, Oscar, et al, Text2Mesh: Text-Driven Neural Stylization for Meshes, arXiv preprint, Dec. 6, 2021., arXiv:2112.03221, arXiv.

* cited by examiner

Text prompt: "a man jumping kick"

Top-k 0.2522    0.2710    0.1982    0.2825    0.2771

Dream Fields     Text2Mesh     CLIP-Actor (base)     CLIP-Actor (full)

"a baseball player throwing a ball"

"Tony Stark wearing blue suit is walking forwards"

Figure 14:
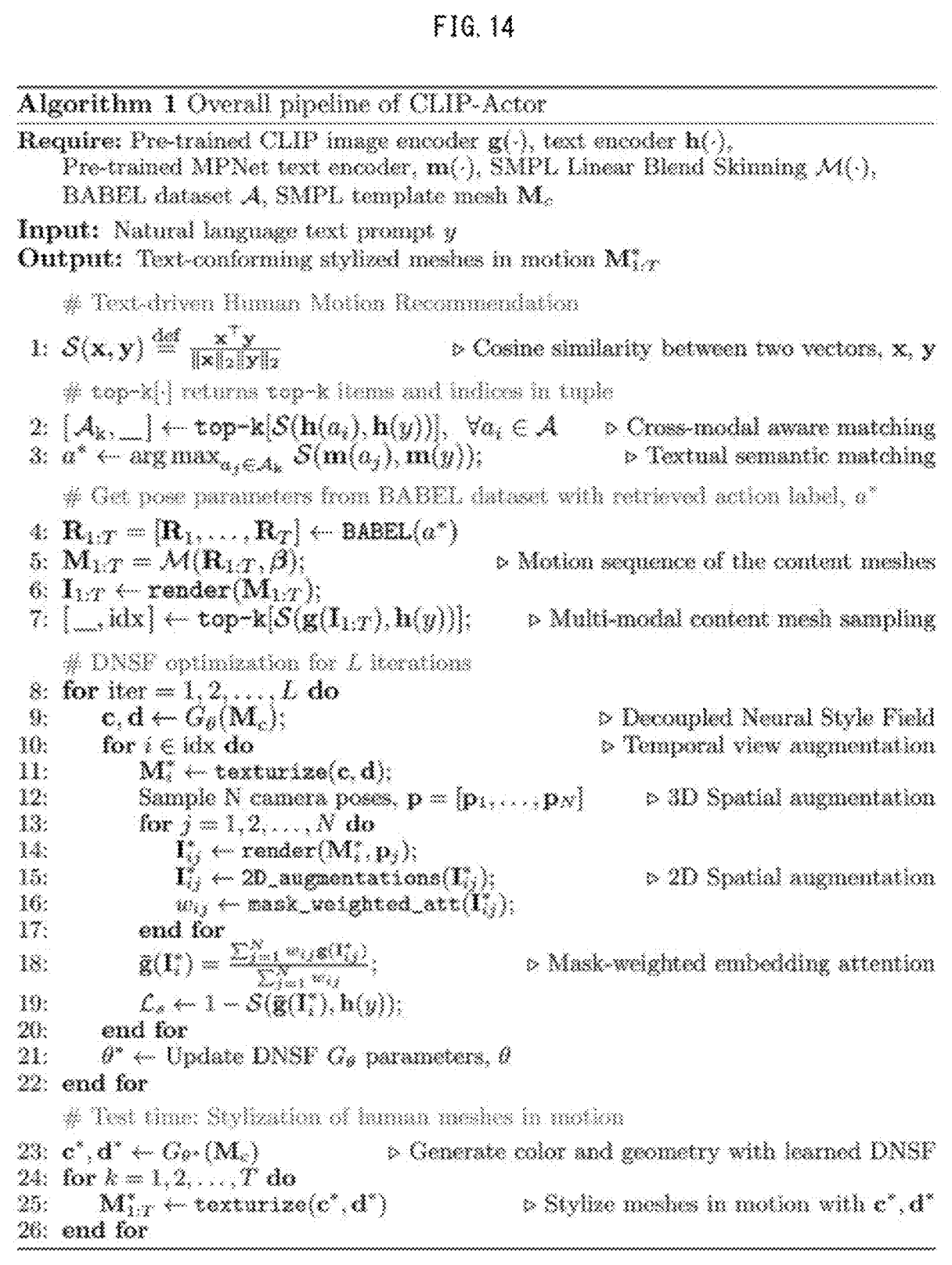

Algorithm 1 Overall pipeline of CLIP-Actor

---

Require: Pre-trained CLIP image encoder $\mathbf{g}(\cdot)$, text encoder $\mathbf{h}(\cdot)$,
   Pre-trained MPNet text encoder, $\mathbf{m}(\cdot)$, SMPL Linear Blend Skinning $\mathcal{M}(\cdot)$,
   BABEL dataset $\mathcal{A}$, SMPL template mesh $\mathbf{M}_c$

Input: Natural language text prompt $y$
Output: Text-conforming stylized meshes in motion $\mathbf{M}^*_{1:T}$

Text-driven Human Motion Recommendation
1: $\mathcal{S}(\mathbf{x},\mathbf{y}) \overset{\text{def}}{=} \frac{\mathbf{x}^\top \mathbf{y}}{\|\mathbf{x}\|_2 \|\mathbf{y}\|_2}$       ▷ Cosine similarity between two vectors, $\mathbf{x}, \mathbf{y}$ top-k[·] returns top-k items and indices in tuple
2: $[\mathcal{A}_k, \_\,] \leftarrow \text{top-k}[\mathcal{S}(\mathbf{h}(a_i), \mathbf{h}(y))], \ \forall a_i \in \mathcal{A}$    ▷ Cross-modal aware matching
3: $a^* \leftarrow \arg\max_{a_j \in \mathcal{A}_k} \mathcal{S}(\mathbf{m}(a_j), \mathbf{m}(y))$;      ▷ Textual semantic matching

Get pose parameters from BABEL dataset with retrieved action label, $a^*$
4: $\mathbf{R}_{1:T} = [\mathbf{R}_1, \ldots, \mathbf{R}_T] \leftarrow \text{BABEL}(a^*)$
5: $\mathbf{M}_{1:T} = \mathcal{M}(\mathbf{R}_{1:T}, \beta)$;       ▷ Motion sequence of the content meshes
6: $\mathbf{I}_{1:T} \leftarrow \text{render}(\mathbf{M}_{1:T})$;
7: $[\_, \text{idx}] \leftarrow \text{top-k}[\mathcal{S}(\mathbf{g}(\mathbf{I}_{1:T}), \mathbf{h}(y))]$;    ▷ Multi-modal content mesh sampling

DNSF optimization for $L$ iterations
8: for iter $= 1, 2, \ldots, L$ do
9:    $\mathbf{c}, \mathbf{d} \leftarrow G_\theta(\mathbf{M}_c)$;          ▷ Decoupled Neural Style Field
10:    for $i \in \text{idx}$ do          ▷ Temporal view augmentation
11:       $\mathbf{M}^c_i \leftarrow \text{texturize}(\mathbf{c}, \mathbf{d})$;
12:       Sample N camera poses, $\mathbf{p} = [\mathbf{p}_1, \ldots, \mathbf{p}_N]$    ▷ 3D Spatial augmentation
13:       for $j = 1, 2, \ldots, N$ do
14:          $\mathbf{I}^*_{ij} \leftarrow \text{render}(\mathbf{M}^c_i, \mathbf{p}_j)$;
15:          $\mathbf{I}^*_{ij} \leftarrow \text{2D\_augmentations}(\mathbf{I}^*_{ij})$;    ▷ 2D Spatial augmentation
16:          $w_{ij} \leftarrow \text{mask\_weighted\_att}(\mathbf{I}^*_{ij})$;
17:       end for
18:       $\bar{\mathbf{g}}(\mathbf{I}^*_i) = \frac{\sum_{j=1}^{N} w_{ij} \mathbf{g}(\mathbf{I}^*_{ij})}{\sum_{j=1}^{N} w_{ij}}$;    ▷ Mask-weighted embedding attention
19:       $\mathcal{L}_\theta \leftarrow 1 - \mathcal{S}(\bar{\mathbf{g}}(\mathbf{I}^*_i), \mathbf{h}(y))$;
20:    end for
21:    $\theta^* \leftarrow$ Update DNSF $G_\theta$ parameters, $\theta$
22: end for

Test time: Stylization of human meshes in motion
23: $\mathbf{c}^*, \mathbf{d}^* \leftarrow G_{\theta^*}(\mathbf{M}_c)$    ▷ Generate color and geometry with learned DNSF
24: for $k = 1, 2, \ldots, T$ do
25:    $\mathbf{M}^*_{1:T} \leftarrow \text{texturize}(\mathbf{c}^*, \mathbf{d}^*)$    ▷ Stylize meshes in motion with $\mathbf{c}^*, \mathbf{d}^*$
26: end for

---

TEXT-DRIVEN MOTION RECOMMENDATION AND NEURAL MESH STYLIZATION SYSTEM AND A METHOD FOR PRODUCING HUMAN MESH ANIMATION USING THE SAME

CROSS-REFERENCE TO RELATED APPLICATIONS

This application claims convention priorities under 35 U.S.C. § 119(a) based on Korean Patent Application No. 10-2023-0018505 filed on Feb. 13, 2023 and Korean Patent Application No. 10-2023-0139071 filed on Oct. 17, 2023, the entire contents of which are incorporated herein by reference.

BACKGROUND

1. Technical Field

Exemplary embodiments of the present disclosure relate to technology for outputting a moving avatar based on input text, and more specifically, to a text-driven motion recommendation and neural mesh stylization system for recommending human motion through hierarchical multi-modal motion search based on the text input and adding stylization to a recommended multi-modal content mesh to generate a human avatar having a motion sequence that best matches a meaning of the text, and a method for producing human mesh animation using the system.

2. Related Art

Manual generation of animatable and detailed 3D avatars is a labor-intensive process that requires intensive labors and pains of creation of professional designers and is cumbersome, time-consuming, and cost-inefficient. To reduce such burdens, many attempts have been introduced to automate animating processes. Furthermore, highly deformable human bodies make it more challenging to design temporally-consistent and detailed geometries and textures.

Thus, there is a need for a new method to generate a 3D human mesh with a realistic and human-recognizable style with detailed geometry and texture using only natural language prompts.

SUMMARY

Accordingly, exemplary embodiments of the present disclosure are provided to substantially obviate one or more problems due to limitations and disadvantages of the related art.

The present disclosure is derived to meet the demands of the prior art technology, and the purpose of this disclosure is to provide a text-driven motion recommendation and neural mesh stylization system for recommending human motion through hierarchical multi-modal motion search based on text input, and adding stylization to multimodal content mesh sampling of the recommended human motion.

Another purpose of the present disclosure is to provide a method for producing human mesh animation using the text-driven motion recommendation and neural mesh stylization system.

According to a first exemplary embodiment of the present disclosure, a text-driven motion recommendation and neural mesh stylization system comprises at least one instruction stored in a memory; and a processor that executes the at least one instruction, wherein the at least one instruction, when executed by the processor, causes the processor to find raw action labels matching a query given as a text prompt in a human motion dataset stored in a database; encode the raw action labels and the query for vectorizing the raw action labels and the query; and measure similarity between the raw action labels and the query based on the vectorized vectors.

In the system, the at least one instruction, when executed by the processor, further causes the processor to select a plurality of indices of the raw action labels based on the measured similarity; and retrieve top-k action labels corresponding the plurality of indices by a top-k filter from encoded motion datasets with the raw action labels.

In the system, the at least one instruction, when executed by the processor, further causes the processor to vectorize the query and the top-k action labels; and retrieve the highest-scored raw action label as the final matched result for the input text prompt.

In the system, the at least one instruction, when executed by the processor, further causes the processor to find the best semantically matched motion sequence from a motion database based on the highest-scored raw action label; and sample content meshes in multi-modal context corresponding the best semantically matched motion sequence.

In the system, the at least one instruction, when executed by the processor, further causes the processor to apply style attributes to the content meshes to obtain a human mesh sequence in motion, the style attributes comprising color and displacement.

In the system, the at least one instruction, when executed by the processor, further causes the processor to obtain the color and the displacement from a decoupled neural style field (DNSF) network that takes a template human mesh and learn text-driven style attributes.

In the system, the at least one instruction, when executed by the processor, further causes the processor to map the style attributes from the template human mesh and merge the style attributes mapped from the template human mesh with the content meshes by the DNSF network.

In the system, the at least one instruction, when executed by the processor, further causes the processor to achieve the same mesh stylization as a basic neural style field while decoupling the style from the content mesh.

In the system, the at least one instruction, when executed by the processor, further causes the processor to detailize and texturize the human mesh sequence by optimizing the DNSF network in a temporally-consistent and pose-agnostic manner.

In the system, the at least one instruction, when executed by the processor, further causes the processor to compute a semantic loss between the input text prompt and a text obtained by encoding the detailized and texturized human mesh sequence for optimizing the DNSF network.

According to another exemplary embodiment of the present disclosure, a method for producing human mesh animation performed by a processor, the method comprises finding raw action labels matching a query given as a text prompt in a human motion dataset stored in a database; encoding the raw action labels and the query for vectorizing the raw action labels and the query; and measuring similarity between the raw action labels and the query based on the vectorized vectors.

The method may further comprise selecting a plurality of indices of the raw action labels based on the measured similarity; and retrieving top-k action labels corresponding the plurality of indices by a top-k filter from encoded motion datasets with the raw action labels. The method may further comprise vectorizing the query and the top-k action labels; and retrieving the highest-scored raw action label as the final matched result for the input text prompt.

The method may further comprise finding the best semantically matched motion sequence from a motion database based on the highest-scored raw action label; and sampling content meshes in multi-modal context corresponding the best semantically matched motion sequence.

The method may further comprise applying style attributes to the content meshes to obtain a human mesh sequence in motion, the style attributes comprising color and displacement.

The method may further comprise obtaining the color and the displacement from a decoupled neural style field (DNSF) network that takes a template human mesh and learn text-driven style attributes.

The method may further comprise mapping the style attributes from the template human mesh and merge the style attributes mapped from the template human mesh with the content meshes by the DNSF network.

The method may further comprise achieving the same mesh stylization as a basic neural style field while decoupling the style from the content mesh.

The method may further comprise detailizing and texturizing the human mesh sequence by optimizing the DNSF network in a temporally-consistent and pose-agnostic manner.

The method may further comprise computing a semantic loss between the input text prompt and a text obtained by encoding the detailized and texturized human mesh sequence for optimizing the DNSF network.

According to the present disclosure, it is possible to provide a text-driven motion recommendation and neural mesh stylization for recommending human motion through hierarchical multi-modal motion search based on text input, and adding stylization to multimodal content mesh sampling of the recommended human motion, and thereby it is possible to create 4D human avatars with the most appropriate movement sequences for the meaning of the text.

Further, according to a configuration of the present disclosure, it is possible to solve the existing problem: prior arts simply applied extreme close-ups to the de-colorized rendering of the meshes, which leads to random, empty rendered images. Such empty images do not conform to the text prompt, and these dummy images can distract the optimization process with random gradient direction. However, a text-driven motion recommendation and neural mesh stylization system according to an exemplary embodiment of the present disclosure, can mitigate this problem with mask-weighted attention embedding.

In addition, according to the present disclosure, it is possible to provide a text-driven 3D avatar creation technology that allows a machine to understand a human's text prompts and completely automatically generate a moving 3D avatar according to the text prompts in a lively manner. Text-driven 3D avatar creation technology is widely used in machine-created media such as virtual human animation, language-driven robot task planning, and movie script visualization. It can be applied widely and effectively.

BRIEF DESCRIPTION OF DRAWINGS

FIG. 14 is an example diagram showing algorithm for overall pipeline of CLIP-Actor.

DETAILED DESCRIPTION OF THE EMBODIMENTS

Figure 1:
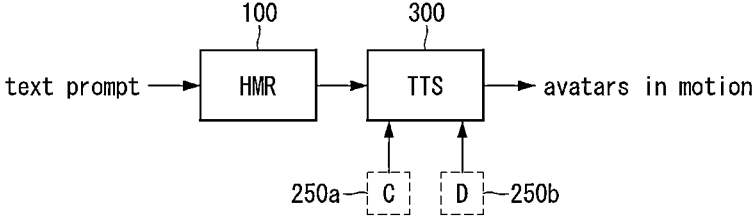
FIG. 1 is a view illustrating a text-driven motion recommendation and neural mesh stylization system (hereinafter referred to as 'CLIP-Actor') according to an exemplary embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system or a memory system to which exemplary embodiments according to the present disclosure are applied will be described. The communication system or the memory system to which the exemplary embodiments according to the present disclosure are applied is not limited to the contents to be described later, and the exemplary embodiments according to the present disclosure may be applied to various communication systems. Here, a communication system may be used in the same meaning as a communication network.

Hereinafter, preferable exemplary embodiments of the present disclosure will be described in more detail with reference to the accompanying drawings. In a description of the present disclosure, in order to facilitate overall understanding, the same reference numerals are used for the same components in the drawings, and overlapping descriptions of the same components are omitted.

The present disclosure is closely related to text-driven 3D object contents and style manipulation. Multi-modal object stylization has been mainly studied using learned multi-modal embedding space, such as a contrastive language-image pre-training CLIP and 3D content/style manipulation methods.

Here, CLIP is a pre-trained model to enable a variety of applications by efficiently learning visual concepts from natural language supervision. Also, CLIP can refer to a model learned to solve the problem of matching an image with text that describes the image while contrasting the image and natural language (text)." And, CLIP-Actor can be referred to as a system implemented using a CLIP model.

Before describing preferred embodiments of the present disclosure, prior work related to the present disclosure will be briefly mentioned as follows.

First, prior work related to text-driven visual data manipulation is as follows. Recent advances in learned text and image joint embedding space have lit a fire in research about the style manipulation of images and 3D objects. CLIP embedding space is learned with abundant natural images and texts and was originally developed for zero-shot image and language analysis tasks. Interestingly, its representation turns out powerful enough to manipulate visual data with intuitive text guides. For images, text conditional image generation has been notably advanced by CLIP. A representative work, StyleCLIP, manipulates an input image by optimizing over its latent code of a pre-trained generative model given a natural language text-prompt. CLIPDraw synthesizes images with text guidance by optimizing the parameters of a set of curves via gradient descent.

Analogous to the image domain, several works extend the manipulation target domain to 3D objects by leveraging the advances in differentiable rendering. The differentiable rendering technique enables seamless gradient flow from 2D rendered images to their 3D objects, allowing CLIP to bridge between language and 3D modalities through 2D images. Dream Fields generates a 3D structure using implicit representation in free space, given a text prompt. It exploits no structural prior knowledge to learn or manipulate 3D contents. This allows flexible content exploration with novel styles but often results in abstract visual contents.

As another concurrent work, Michel et al. propose Text2Mesh, a CLIP-guided optimization method to manipulate the given fixed source mesh styles to conform to the target text condition prompt. In contrast to Dream Fields, since Text2Mesh stylizes a 3D object over the displacement and its texture map defined on a fixed, T-posed template human mesh, it imposes strong structural prior. It demonstrates plausible and interesting styles and textures of meshes given a text prompt. However, it is observed that when the given template mesh is hard to conform to the given text prompt, it produces undesirable stylization; e.g., the text containing detailed human action produces a failure of stylization when the pose of the given human template mesh and the action are not conformed to each other.

Accordingly, the present disclosure focuses on animating human meshes with details and styles according to the input text prompt. Further, the present disclosure exploits the parametric human mesh model to disentangle style from geometric contents, i.e., pose. Such disentanglement enables the pose, detail, and style of human mesh to conform to the input text sequentially. This enables to stably manipulate 3D human objects, better conforming to the input text prompt from action to style.

Next, prior work related to text-driven human motion manipulation is as follows. Many recent approaches have been studied to generate human body motion with given natural language descriptions. One line of prior works guides the machine to translate natural language descriptions in a sequential manner and generate human skeletal motions using recurrent neural models. Another line of prior works generates human motion conditioned on the limited number of closed-set action categories. CLIP-Actor of the present embodiment focuses on textual and visual semantics in a whole sentence and can tackle various natural language descriptions.

Recently, MotionCLIP and TEMOS propose to learn the natural language conditioned mesh motion generation. MotionCLIP learns the human motion autoencoder and makes its latent space compatible with CLIP text and image space using semantic similarity. Similarly, TEMOS learns generative human mesh motion latent space with transformer-VAE (variational autoencoder) and aligns it with natural language latent space via DistilBERT, thus composing the cross-modal motion latent space. While both methods focus on the latent space to capture textual and visual semantics of natural language descriptions, CLIPActor directly maps the descriptions to realistic motion using a recommendation system. Moreover, the detailed volumetric meshes are stylized with appearance attributes much more expressive than those of the aforementioned methods.

Next, prior work related to a texture and geometric stylization of human mesh in motion is as follows. Aside from 3D mesh pose, recent work has added different levels of details to bare human meshes, e.g., cloth modeling or texture color. The separate modeling of human and cloth meshes, the neural extension of the parametric human mesh model, the neural parametric approach, and the neural implicit approach show promising clothed human mesh results from the given human scans, but without surface colors. Those works deal with texture and geometric styles separately. Recently, Saito et al. propose a weakly-supervised way to recover both texture and geometric styles.

None of these methods can generate diverse color and cloth details of human motion in a zero-shot manner, e.g., with only a text guide. Accordingly, the present disclosure presents a novel text-driven recommendation, detailization, and texturization of animating human meshes in zero-shot, where human meshes in motion with texture and geometric details are generated from the machine's imagination without the task dataset.

Figure 2:
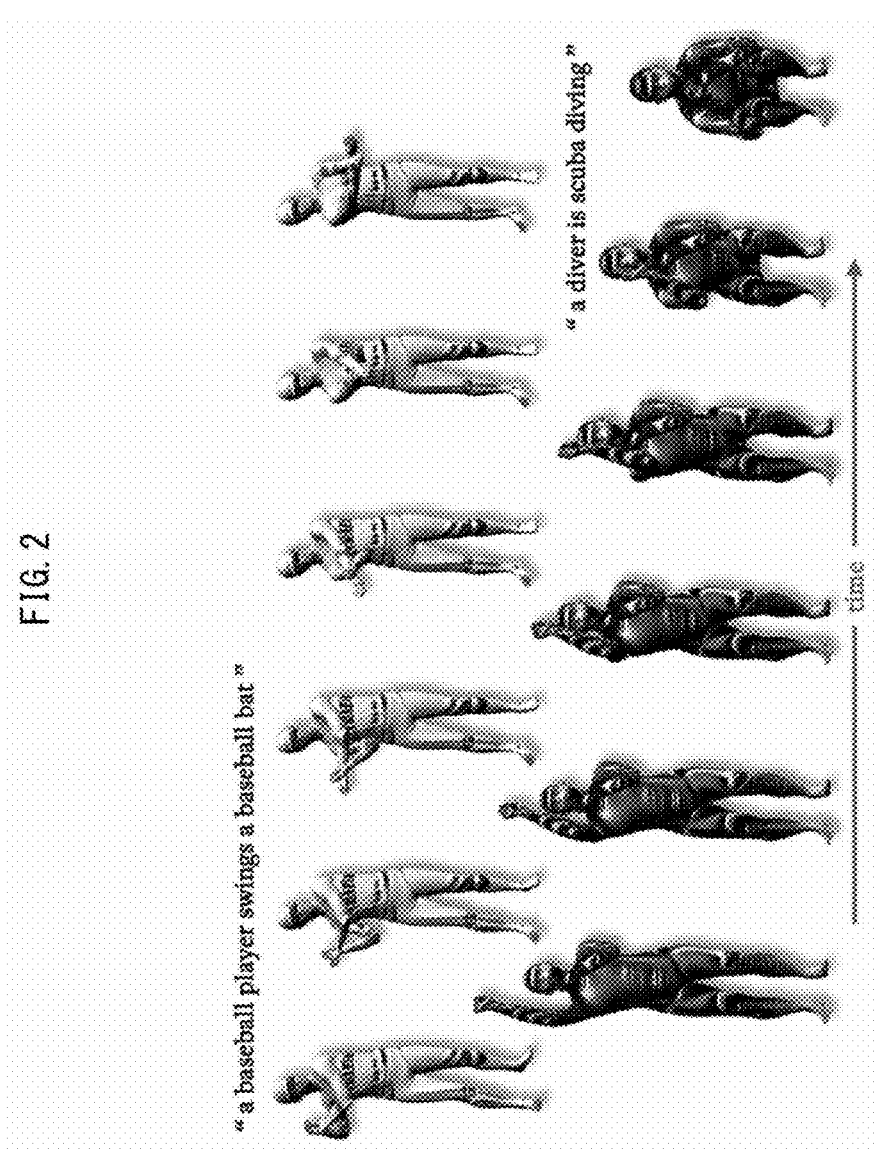
FIG. 2 is a schematic diagram for describing human avatars in motion that are output from CLIP-Actor with the given input text prompt.

FIG. 1 is a view illustrating a text-driven motion recommendation and neural mesh stylization system (hereinafter referred to as 'CLIP-Actor') according to an exemplary embodiment of the present disclosure. FIG. 2 is a schematic diagram for describing human avatars in motion that are produced by CLIP-Actor with the given input text prompt.

Referring to FIG. 1, a text-driven motion recommendation and neural mesh stylization system (hereinafter referred to as 'a CLIP-Actor') includes a human motion recommendation system (hereinafter briefly referred to as 'HMR') 100 and a Text-time stylization system (hereinafter briefly referred to as 'TTS') 300. Further, a text-driven motion recommendation and neural mesh stylization system may be also referred to as one of 'text-driven motion recommendation apparatus,' 'text-driven neural mesh stylization apparatus,' 'dynamic avatar producing apparatus,' and 'human mesh animation producing apparatus.'

HMR 100 may take input text prompt, finds the best semantically matched motion sequence from the motion database, and recommend a human motion sequence that conforms to the text prompt. In addition, TTS 300 may produce avatars in motion by applying style attributes to the recommended human meshes. The style attributes may include color 250*a* and displacement 250*b* generated in 3D vertices of the human meshes by a neural network. During performing such process, the avatars in motion that best match the text prompt may be generated.

Meanwhile, the present disclosure is from the text-visual coupled understanding of humans. For example, when an actor reads a script for a play, the actor brings up an image of gestures, tone of speech, and clothes to her/his mind following the context described in the script. Such text-visual coupled imagination can be a breakthrough for accelerating machine-created media, e.g., stylized 3D humans in motion. It can be embodied to the machine by leveraging the text-image joint embedding space of CLIP. With the representational power of the CLIP embedding space, the similarity measure between text and image provides concrete supervision in building text-to-3D human meshes in motion.

Accordingly, the inventors of the present disclosure provide CLIP-Actor, an automated framework of text-driven recommendation and stylization of animating 3D human meshes. Given an input text prompt, CLIP-Actor may recommend the best matching human meshes in motion and iteratively stylizes them by synthesis-through-optimization. CLIP-Actor can detail and texturize not just a single mesh frame but a short action clip by optimizing temporal-consistent and pose-agnostic style attributes. Also, given a text prompt describing human action and style, CLIP-Actor crafts a short clip of animated human meshes conforming to the prompt as shown in FIG. 2. In this embodiment, the text prompt is as follows: "a baseball player swings a baseball bat."

The CLIP-Actor is free from extra artist-designed 3D mesh inputs since it searches meshes in motion from a database that strongly correlates with the given query text. Also, the CLIP-Actor is configured to use a hierarchical text-driven human motion recommendation module that utilizes fine-grained textual semantic matching to capture visual and textual cues within the text prompt.

Further, the CLIP-Actor then detailizes and texturizes the mesh sequence by optimizing a proposed Decoupled Neural Style Fields (DNSF) in a pose-agnostic manner. The objective of the optimization is to maximize the correlation between the input text prompt and 2D rendered images of the stylized 3D mesh. DNSF may be optimized with spatio-temporally augmented rendered images and an initial content mesh may be provided with a multi-modal sampling strategy.

Moreover, mask-weighted embedding attention can be further applied for stable neural optimization. In this case, CLIP-Actor can stylize visually and physically plausible 3D human meshes in motion with various text descriptions in zero-shot. The DNSF may learn style attributes of the human meshes in motion in a temporally consistent and pose-agnostic manner. The style attributes may include color and displacement that are produced on 3-dimension vertex of the human meshed by a neural network. In addition, the CLIP-Actor may further apply multi-modal content mesh sampling, spatio-temporal view augmentation, and mask-weighted embedding attention to improve the convergence of the text-driven neural DNSF optimization.

By utilizing this neural optimization, that is, the optimization of a neural network, the DNSF can be optimized with spatio-temporally augmented rendered images, and therefore the CLIP-Actor may provide an initial content mesh with a multi-modal sampling strategy.

Such as, the CLIP-Actor can stylize visually and physically plausible 3D human meshes in motion with various text descriptions in zero-shot. 3D human avatars in motion are produced by stylizing the 3D human meshes. The 3D human avatars may be referred to as a 4D human avatar or a dynamic human avatar.

According to the disclosure, means corresponding to a generative network or generative artificial intelligence AI, or a component or apparatus that may perform a function corresponding to such means, understands input text prompts and can automatically generate a moving 3D human avatar with a temporally consistent representative style or pose related to the input text prompts.

Figure 3:
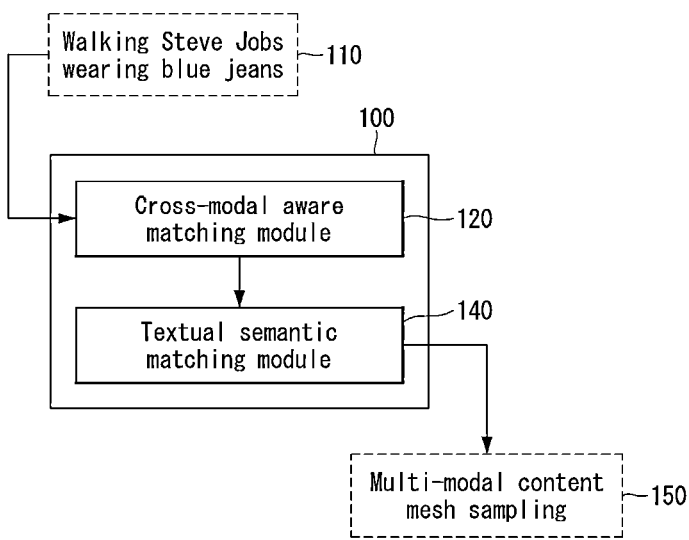
FIG. 3 is a schematic block diagram illustrating a human motion recommendation (HMR) system of a configuration applicable to CLIP-Actor of FIG. 1.

FIG. 3 is a block diagram illustrating text-driven the human motion recommendation system that can be applied the CLIP-Actor of FIG. 1.

Referring to FIG. 3, the human motion recommendation system (HMR) 100 is configured to include a cross-modal aware matching module 120 and a textual semantic matching module 140.

The HMR 100 may obtain an input text prompt 110 as a query and retrieve the best semantically matched motion sequence from a motion database. The motion database may include a large scale of human motion dataset with language labels, containing frame-level aligned SMPL pose parameters and raw action labels. The term of SMPL stands for a skinned multi-person linear model.

Given the text prompt as a query, the raw action label that is visually and linguistically associated with the query is matched by the HMR 100. Here, a two-stage retrieval composed of cross-modal aware matching and textual semantic matching is designed for the HMR 100. This hierarchical matching enables CLIP-Actor to catch visual-language (cross-modal) aware contexts and linguistic semantics. These comprehensive matching modules hand over good initial content to the subsequent neural mesh stylization.

More specifically, the HMR 100 may find the most relevant raw action label from the database when an input text prompt 110 as a query is given, and obtain a multi-modal content mesh sampling 150 through textual semantic matching based on the raw action label matching the query. The input text prompt, for example, is a sentence of "walking Steve Jobs wearing blue jeans."

The cross-modal aware matching module 120 may obtain the input text prompt as a query and find a sequence of 3D meshes that conforms to the input prompt, i.e., walking, by retrieving a motion sequence from the human motion dataset stored in the database. The sequence of 3D meshes have action labels.

Further, the cross-modal aware matching module 120 may measure similarity between them. Top-k indices of raw action labels are selected and corresponding raw action labels are retrieved by top-k filter. Also, the cross-modal aware matching module 120 may vectorizes the query and top-k action labels. The top-k action labels may include the high test-scored raw action label. The highest-scored raw action label may be retrieved as the final matched result for the input text prompt. Also, the cross-modal aware matching module 120 may measure similarity between the query and all of the raw action labels encoded by CLIP text encoder. For this, the cross-modal aware matching module 120 is configured to include a vectorization module and a similarity calculation module.

The textual semantic matching module 140 may find the most relevant action label with the input text prompt by capturing textual semantics in the sentence of the input text prompt.

As mentioned above, the HMR 100 may obtain a motion sequence that conforms to the text prompt. The HMR 100 may recommend the motion by retrieving visually and textually relevant action label from the dataset. In other words, when given the text prompt as a query, the raw action label that is visually and linguistically associated with the query is matched through the HMR system 100. The HMR system 100 can perform a two-stage retrieval of cross-modal aware matching and textual semantic matching. The hierarchical matching enables the CLIP-Actor to catch cross-modal aware contexts and linguistic semantics. This comprehensive matching module hands over good initial content to the subsequent neural mesh stylization module (refer to 300 in FIG. 6). The good initial content may include multi-modal content mesh sampling. The HMR system 100 may be referred to as a module for hierarchical multi-modal motion retrieval.

Figure 4:
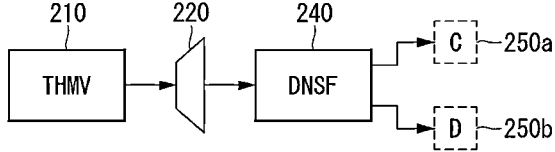
FIG. 4 is a schematic block diagram illustrating a decoupled stylization system of a configuration applicable to CLIP-Actor of FIG. 1.

FIG. 4 is a schematic block diagram illustrating a decoupled stylization system of a configuration applicable to CLIP-Actor of FIG. 1

Referring to FIG. 4, the decoupled stylization system includes a positional encoding module 220 and a decoupled neural style field (DNSF) module 240. The decoupled stylization system may obtain a template human mesh vertices (THMV) 210 and generate color 250a and geometry with learned DNSF. The geometry may include displacement 250b.

The template human mesh vertices 210 may include a T-posed human mesh. The template human mesh vertices 210 may be briefly referred to a template human mesh, template mesh or a human mesh.

The positional encoding module 220 may perform the Fourier feature-based positional encoding to the mesh vertices which helps the style field to cover higher frequency details.

The DNSF module 240 may include neural network and be learned for outputting the optimized style attributes. The DNSF module 240 may include neural network and be briefly referred to a DNSF network or a DNSF. The DNSF module 240 is explained in detail in the examples below, so its detailed description is omitted here to avoid duplication.

According to the decoupled stylization system, the CLIP-Actor can provide style attributes generated based on template mesh with the content mesh.

Figure 5:
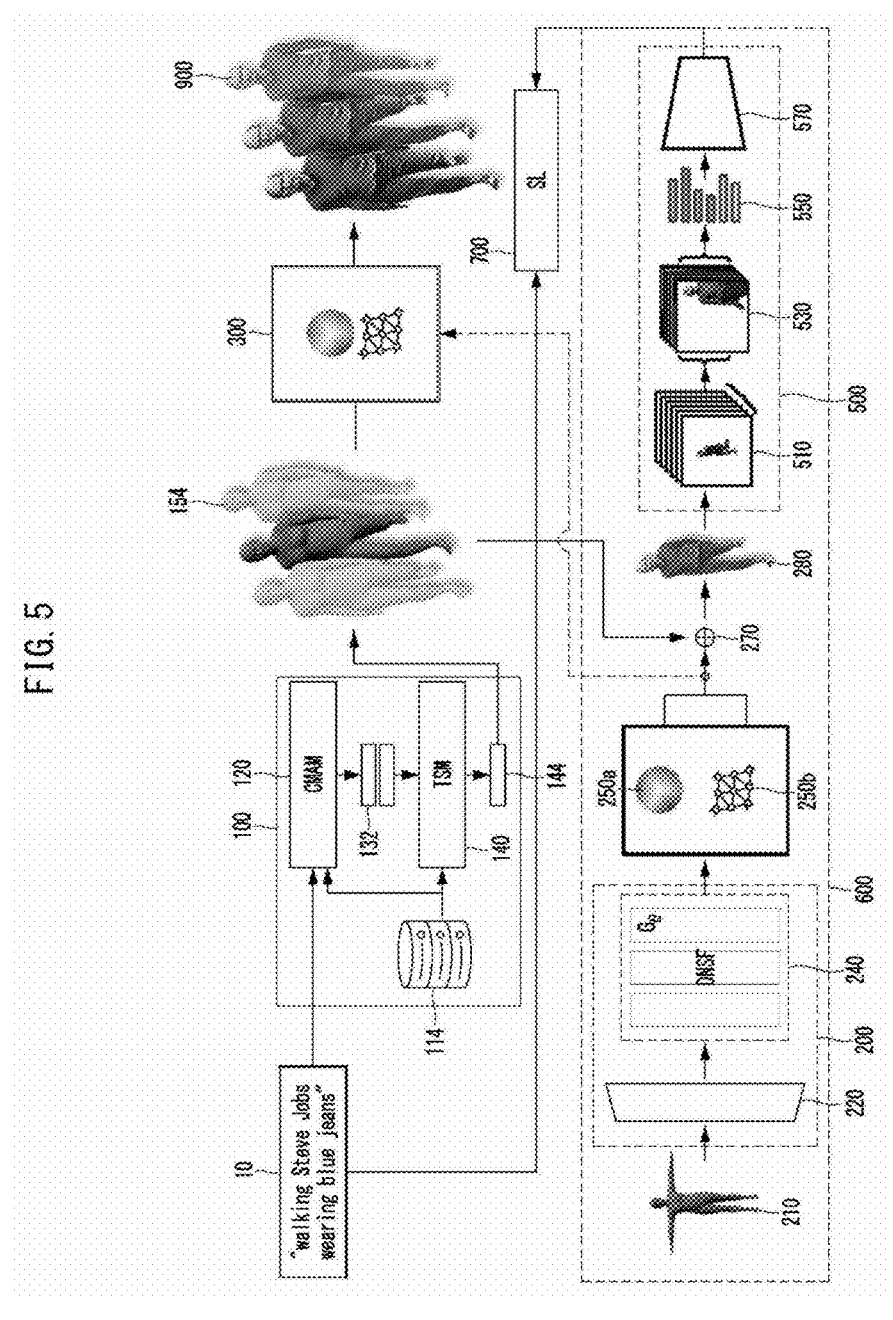
FIG. 5 is a detailed block diagram for describing overall architecture of CLIP-Actor according to another exemplary embodiment of the present disclosure.

FIG. 5 is a detailed block diagram for describing overall architecture of CLIP-Actor according to another exemplary embodiment of the present disclosure.

Referring to FIG. 5, overall architecture of CLIP-Actor is provided. In the overall architecture, given a text description of the human action, a text-driven human motion recommendation module 100 may find the best semantically matched motion sequence from the motion database. Content meshes are then sampled in a multi-modal context. Decoupled Neural Style Field takes a T-posed human mesh and learns text-driven style attributes, which are then applied to the content meshes. The CLIP-Actor may apply spatio-temporal view augmentation and weight rendered images to guide the neural optimization with similarity among rendered images and the text.

In other words, the CLIP-Actor may include the human motion recommendation system (HMR) 100 and a neural optimization system 600. The neural optimization system 600 may include the decoupled stylization system (see FIG. 4). Also, CLIP-Actor may further include test-time stylization (TTS) system 300. The HMR 100 may include the cross-modal aware matching (CMAM) module 120 and textual semantic matching (TSM) module 140. The HMR 100 may further include a database system 114. In this embodiment, the database system or data stored therein may be referred by the same reference.

Specifically, the CMAM module 120 may find action labels 132 matching the query given as the input text prompt 110 in the human motion dataset stored in the database 160. Additionally, the text semantic matching module 140 may extract the action label 144 through text semantic matching based on the action labels 132 for the human motion dataset. Human motion corresponding to the extracted action label can be extracted using multi-modal content mesh sampling (MMCMS) 154. The database 160 may be included in the HMR system 100 in a broad sense, but is not limited thereto and may be configured as a separate unit or system.

More specifically, the HMR 100 may be configured to find raw action labels matching a query given as a text prompt in a human motion dataset stored in a database; encode the raw action labels and the query for vectorizing the raw action labels and the query; measure similarity between the raw action labels and the query based on the vectorized vectors; select a plurality of indices of the raw action labels based on the measured similarity; retrieve top-k action labels corresponding the plurality of indices by a top-k filter from encoded motion datasets with the raw action labels; vectorize the query and the top-k action labels; retrieve the highest-scored raw action label as the final matched result for the input text prompt; find the best semantically matched motion sequence from a motion database based on the highest-scored raw action label; and sample content meshes in multi-modal context corresponding the best semantically matched motion sequence.

The test-time stylization (TTS) system 300 may create sequences of 3D human meshes in motion by applying the optimized style attributes to the multi-modal content mesh sampling 154 from the HMR system 100. In other words, the TTS system 300 may receive the optimized style attributes including color 250a and displacement 250b from the neural optimization system 600 and apply the optimized style properties for the multi-modal content mesh sampling 154 to generate the sequence.

The neural optimization system 600 may include a positional encoding module 220 and a DNSF module 240. The location encoding module 220 may obtain template human mesh vertices (THMV) 210 from a database and perform location-based encoding. The template human mesh vertices 210 may include poses of the human template mesh corresponded to the text prompt. The poses may be expressed by at least some three-dimensional coordinates on the human template mesh. In addition, the DNSF module 240 may receive a full sequence of the template human meshes with a specific posture as "content" and learns the style such as the color 250a and displacement 250b of the mesh vertices, and produce a sequence of textured mesh.

In addition, the neural optimization system 600 may be configured to obtain the color and the displacement from a decoupled neural style field (DNSF) network that takes a template human mesh and learn text-driven style attributes; map the style attributes from the template human mesh and merge the style attributes mapped from the template human mesh with the content meshes by the DNSF network; achieve the same mesh stylization as a basic neural style field while decoupling the style from the content mesh; detailize and texturize the human mesh sequence by optimizing the DNSF network in a temporally-consistent and pose-agnostic manner; and apply style attributes to the content meshes to obtain a human mesh sequence in motion, the style attributes comprising color and displacement.

The neural optimization system 600 mentioned above may include, but is not limited to, a spatio-temporal view augmentation module 500. The spatio-temporal view augmentation module 500 may be a means or configuration independent of CLIP-Actor.

The spatio-temporal view augmentation system 500 may include a temporal view augmentation module 510 and a spatial view augmentation module 530. The spatio-temporal view augmentation system 500 may further include a mask-weighted embedding attention module 550 and a CLIP encoder 570. However, each of the mask-weighted embedding attention module 550 and the CLIP encoder 570 may be only connected to the spatio-temporal view augmentation system 500 and be arranged in separate configurations that are independent or separate from the spatio-temporal view augmentation system 500.

Regarding the spatio-temporal view augmentation module, existing studies have shown that spatial augmentation, such as 3D viewpoint or 2D image augmentation, improves the quality of content creation. Accordingly, in this embodiment, as an extension of existing studies, CLIP-Actor may be configured to leverage both multi-view properties and human motion originating from temporal movement. This naturally diversifies views in a combinatorial way by the spatio-temporal context of human motion.

The CLIP encoder 570 may encode the rendered images as a pre-trained CLIP encoder. The CLIP encoder 570 may perform differentiable 2D image augmentations including random crop and perspective transformation.

According to the above-described configuration, the spatio-temporal view enhancement system 500 may use the 3D avatar 280 as input data. The 3D avatar 280 may correspond to a non-optimized motion sequence of 3D human meshed in motion (see 900). The 3D avatar 280 may be obtained by applying the style attributes generated by the DNSF module 240 to the multi-modal content mesh sampling 154 generated by the HMR system 100 using the addition operator 270. The CLIP-Actor may then calculate the semantic loss (SL, 700) based on a vector or a value output from the spatio-temporal view enhancement unit 500 and an output value obtained from the input text prompt 110. By minimizing this semantic loss below a certain threshold, CLIP-Actor can optimize DNSF and generate dynamic avatars with excellent quality.

Figure 6:
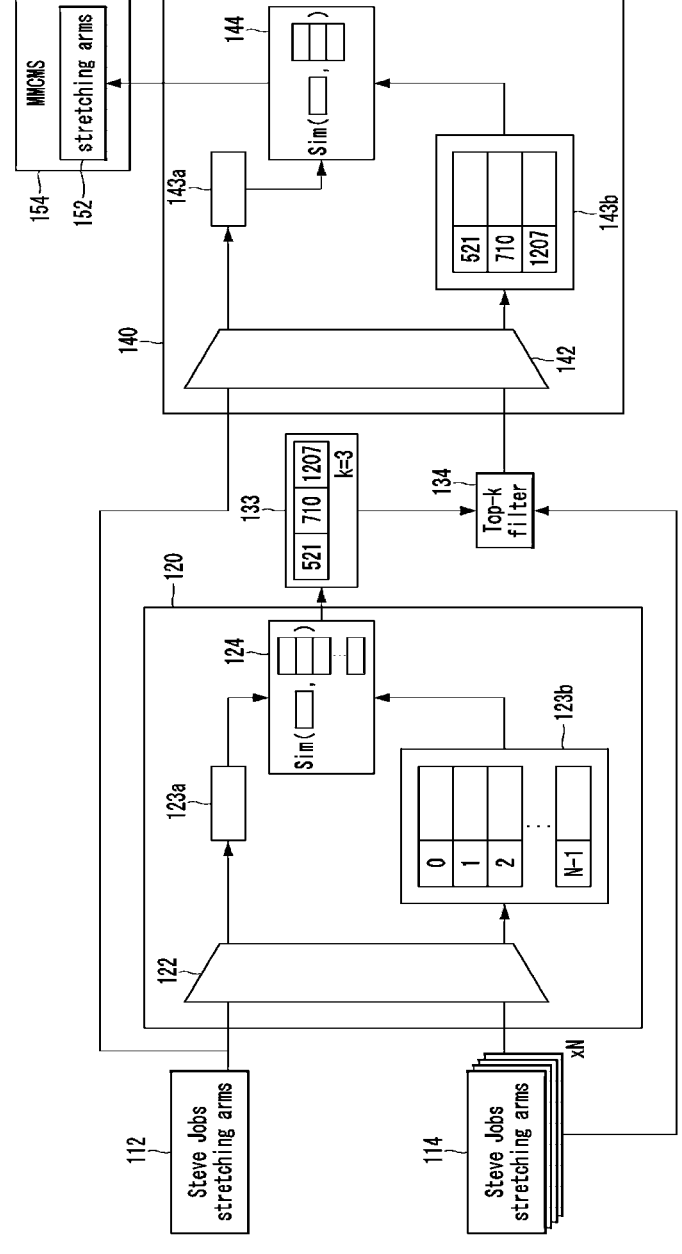
FIG. 6 is a detailed block diagram for describing the HMR system of a configuration applicable to CLIP-Actor of FIG. 5.

FIG. 6 is a detailed block diagram for describing the HMR system of a configuration applicable to CLIP-Actor of FIG. 5.

Referring to FIG. 6, the HMR system may include a text-based hierarchical multi-modal motion retrieval module (hereinafter briefly referred to as "the retrieval module"). The retrieval module may perform a hierarchical search for the corresponding motion from text-only input using a multimodal embedding model and language model. In other words, the retrieval module may re-rank the priorities of motion candidates searched through multimodal embedding based on the embedding similarity of the large language model.

To this end, the retrieval module may include a cross-modal aware matching (CMAM) module 120 and a text semantic matching (TSM) module 140. The hierarchical module may further include an index unit 133 and a filter 134 located between the CMAM module 120 and the TSM module 140.

Specifically, the CMAM module 120 may include a first encoder 122, a first vector 123a, a first database 123b, and a first similarity calculator 124. The first encoder 122 may be referred to as a text encoder. The CMAM module 120 may obtain an input text prompt 112 as a query. The text prompt 112 may be "Steve Jobs stretching arms."

In the CMAM module 120, the first encoder 122 may obtain the input text prompt 112 and an action label matching the query of the text prompt 112 from the human motion dataset, and generate encoded query 123a and encoded action label by encoding the query and the action label. Here, the encoded query 123a may be referred to as the first vector 123a that vectorizes the query. In addition, the encoded action label may be referred to as a second vector that vectorizes the action label, and may be stored in the first dataspace 123b. Additionally, in the CMAM module 120, the first similarity calculation unit 124 may calculate similarity between the vectors generated through the above mentioned vectorization.

Among the calculated similarity values, the highest k values (Top-k) may be stored in the index unit 133. For example, the index unit 133 may select and index three values (eg, 521, 710, and 1207) starting from the highest priority value. Indexed values and text data 114 from database may each be input to filter 134. The filter 134 can search the corresponding raw action label as a top-k filter, with the top k (Top-k) indices selected.

The TSM module 140 may include a second encoder 142, a second vector 143*a*, a second database 143*b*, and a second similarity calculator 144. The second encoder 142 may be referred to as a language model. The language model can include a large language model. In the TSM module 140, the second encoder 142 may receive a text prompt 112 and fine an action label for the top k similarity values from the filter 134 in the database (hereinafter referred to as 'second action label'). Also, the second encoder 142 may encode the query and the second action label of the text prompt 112 to generate an encoded query 143*a* and an encoded top-k action label.

Here, the encoded query 143*a* may be referred to as a third vector that vectorizes the query. Additionally, the encoded top-k action labels may each be referred to as a fourth vector that vectorizes the action labels, and may be stored in the second database 143*b*. Additionally, in the TSM module 140, the second similarity calculation unit 144 may calculate similarity between vectors generated through vectorization.

Such as, the TSM module 140 can capture sentences within the input text prompt 110 using a text encoder and find the action label most relevant to the text prompt through the captured text semantics. The multi-modal content mesh sampling 154 can be obtained based on the action label 152 most relevant to the text prompt.

The operating principle of the above-described hierarchical multi-modal motion retrieval module may be briefly described as follows. Given a text prompt as a query, the instrumental search system finds the most relevant raw action labels in the database. Next, the hierarchical search system encodes the query and all raw action labels by a text encoder and measures the similarity between them. The top k indices of the raw action label are selected, and the corresponding raw action label can be searched by the top-k filter. The language model encoder can vectorize query and top-k action labels. The raw action label with the highest similarity score can be retrieved as the final matching result for the input text prompt.

According to the above-described configuration, a hierarchical multimodal motion search system can output matched raw action labels for input text prompts.

Referring to FIGS. 5 and 6 again, the goal of CLIP-Actor is to visualize 3D motion that conforms to the input description by stylizing mesh with the color and displacement of its vertices. For example, consider a natural language prompt, "walking Steve Jobs wearing blue jeans." Instead of preparing extra fixed 3D mesh inputs, CLIP-Actor may obtain a sequence of 3D meshes that conforms to the input text prompt, i.e., walking, by retrieving a motion sequence from a dataset. The retrieved mesh sequence becomes the "content" of mesh stylization. CLIP-Actor then grant the characteristics, e.g., cloth, hair, to the meshes by optimizing the neural model to learn the color and displacement of the mesh vertices. Finally, CLIP-Actor may generate a short clip of walking Steve jobs wearing blue jeans.

Formally, given a text prompt y, CLIP-Actor may retrieve a sequence of pose parameters $R_{1:T} = [R_1, \ldots, R_T]$ of a skinned multi-person linear model (SMPL) for duration T. In a single frame t, mesh vertices $M_t$ can be acquired with a linear mapping as: $M_t = M(R_t, B_t)$, $\forall_t \in \{1, \ldots, T\}$, where $R_t$ denotes the pose parameters, and $\beta_t$ the shape parameters for a human mesh. Then, a single mesh at frame t is represented by the faces F, and the 3D mesh vertices $M_t \in R^{V \times 3}$, where V is the number of vertices. Since SMPL mesh faces F for every frame are identical with given triangulation, a single mesh may be represented using the mesh vertices, $M_t$. Hence, $M_{1:T} = [M_1, \ldots, M_T]$ denotes a full sequence of human meshes and is taken to the decoupled neural style field (DNSF) as "content." The DNSF then learns "style," i.e., color and displacement, of mesh vertices and produces a sequence of textured mesh $M^*_{1:T}$.

Text-Driven Human Motion Recommendation

The text-driven human motion recommendation module 100 may obtain a motion sequence that conforms to the text prompt. The text-driven human motion recommendation module 100 may recommend the motion by retrieving visually and textually relevant action labels from the dataset. The text-driven human motion recommendation module 100 may include a hierarchical multi-modal motion retrieval module with a cross-modal aware matching (CMAM) module 120 and a textual semantic matching (TSM) module 140.

The hierarchical multi-modal motion retrieval module may obtain a motion sequence corresponding to the given text prompt. A large scale human motion dataset with language labels may be utilized. The human motion dataset may contain frame-level aligned SMPL pose parameters and raw action labels. Given the text prompt as a query, the raw action label that is visually and linguistically associated with the query is matched through the motion recommendation system 100. CLIP-Actor may be designed to perform a two-stage retrieval that is configured by cross-modal aware matching and textual semantic matching. The hierarchical matching enables CLIP-Actor to catch visual-language (cross-modal) aware contexts and linguistic semantics. These comprehensive matching modules hand over good initial content to the subsequent neural mesh stylization system 600.

The cross-modal aware matching module 120 may find the action labels similar to the input text prompt 10 on the joint image-text space. A database 114 may be prepared. The database 114 may include a set of raw action labels A, gathered from the database. The cross-modal aware matching module 120 may retrieve a set $A_k \subset A$ of the raw action label $a_i \in A$, given a text prompt y, as Equation 1 below.

$$A_k = \text{top} - k[S(h(a_i), h(y))], \text{ where } S(x, y) = \frac{x^\top y}{\|x\|_2 \|y\|_2} \quad \text{[Equation 1]}$$

In Equation 1, h($\bullet$) is the pre-trained CLIP text encoder, and top-k[$\bullet$] denotes a function that returns k best matches. The similarity may be measured by the cosine similarity.

Specifically, consider an input prompt "a man walking backwards." The cross-modal aware matching module 120 may vectorize the input prompt 10 and the action labels using the CLIP text encoder and compute the similarity between them. The set of matched action labels 132 $A_k$ is determined as {"walking in place," "walking backward," "walking laterally"} and the top-1 matched label is "walking in place." Since the CLIP text encoder is learned to focus on words that appear visually, it catches visual semantics (i.e., walking), and all the elements in $A_k$ are closely related to the input prompt in visual space. However, the text encoder of CLIP is trained with still images instead of videos so that it cannot distinguish fine-grained action (i.e., "walking in place" vs. "walking backwards"; because both appear to be the same in a still image). Thus, CLIP-Actor may be configured to use a textual semantic matching as the following step to compensate for the single-stage retrieval.

The textual semantic matching module 140 may find the most relevant action label with the input prompt 10 by capturing textual semantics in the sentence. A language expert may be utilized, so that the two-stage module can distinguish textual semantics and grammatical structures. The best matching label $a_*$ is retrieved as Equation 2 below.

$$a_* = \text{argmax}_{a_j \in A_k} S(m(a_j), m(y))$$ [Equation 2]

In Equation 2, m(•) denotes a pre-trained encoder. The masked and permuted language modeling (MPNet for short) encoder may be used as the pre-trained encoder.

Again, consider the above example of "a man walking backwards." The top-k action labels may be re-ranked, and the most similar action label "walking backward" (see 144) may be retrieved as a final result. The sequence of meshes MIT 154 associated with the retrieved action label is passed to the following neural mesh stylization pipeline as the content mesh sequence.

Decoupled Stylization of Human Meshes in Motion

Furthermore, CLIP-Actor may represent a stylized human mesh with the content mesh and the style attributes. In practice, the content mesh may be denoted as $M_i \in R^{V \times 3}$ sampled from the retrieved human motion sequence of T frames, $M_{1:T}$. The mesh's surface style attributes {c, d}$\in \{R^{V \times 3}, R^V\}$ are interpreted as the per-vertex RGB color and per-vertex displacement, which are applied over surfaces via given triangulation. The existing neural style field network takes a fixed static mesh as input and learns the style attributes with a multi-layer perceptron (MLP). The existing network claims that this implicit formulation tightly couples the style field to the source mesh. However, since the existing neural style field network takes a single posed mesh at a time, a significant number of MLPs are required to stylize a sequence of human meshes.

Decoupled Neural Style Field

Instead, CLIP-Actor may be configured to use a decoupled neural style field (DNSF). The DNSF may be referred to as a DNSF network. CLIP-Actor may be configured to rather decouple the style field from the content mesh so that CLIP-Actor needs only one neural network to learn style attributes for the meshes in motion. Specifically, CLIP-Actor may first map the style attributes from the template human mesh Me and merge it with the content meshes $M_i$, $\forall_i \in \{1, \dots, T\}$, right before rendering. DNSF can achieve the same mesh stylization as the basic neural style field while effectively decoupling the style from the content mesh. In practice, parameterized as an MLP Ge, DNSF may map the vertices on the template human mesh, i.e., T-posed SMPL Mc, to style attributes c and d, in a pose-agnostic manner as Equation 3 below.

$$\text{DNSF}: G_\theta(M_c) \mapsto \{c, d\}$$ [Equation 3]

CLIP-Actor may also employ the Fourier feature-based positional encoding to the mesh vertices, which helps the style field to cover higher frequency details. In detail, the MLP $G_\theta$ may get the positional encoded feature as input and outputs per-vertex RGB value, $c \in [0, 1]^{V \times 3}$, and per-vertex displacement value, $d \in [-0.1, 0.1]^V$, along the per-vertex normal direction. The predicted style attributes are then applied to the content posed mesh $M_i$ to produce the stylized human mesh $M_i^*$.

Text-Driven DNSF Optimization

The core of the text-driven DNSF optimization is to maximize the semantic correlation between the visual mesh observation and the input text prompt. However, CLIP-Actor cannot directly utilize the existing CLIP, for contrastive language-image pre-training, to measure the semantic correlation with the created 3D mesh itself because the CLIP visual encoder is designed and trained only for 2D images. CLIP-Actor leverages an intuitive idea that the observations of a 3D object can be described similarly from any viewpoint. To utilize the representation power of CLIP as a supervision signal, CLIP-Actor may first render images of the 3D meshes for input compatibility. With randomly sampled N camera poses, $p=[p_1, \dots, p_N]$, CLIP-Actor may differentiably render the stylized mesh $M_i^*$ to get N-view rendered images $I_{ij}^*$, $\forall_j \in \{1, 2, \dots, N\}$. Thereby, the main optimization objective, semantic loss, may be defined with the pre-trained CLIP image and text encoders, g(•) and h(•), as Equation 4 below.

$$\mathcal{L}_s = 1 - \frac{\bar{g}(I_i^*)^\top h(y)}{\|\bar{g}(I_i^*)\|_2 \|h(y)\|_2}, \bar{g}(I_i^*) = \frac{1}{N} \sum_{j=1}^N g(I_{ij}^*)$$ [Equation 4]

In Equation 4, y denotes the input text prompt, and $g(I_i^*) \in R^{512}$ and $h(y) \in R^{512}$ denote the unnormalized CLIP embedding vectors for the image and the text prompt, respectively.

As known in Equation 4, the semantic loss is basically a cosine similarity between the normalized mean embedding vectors for N rendered images of the stylized mesh $M_i$ and the normalized embedding for the input text prompt y.

Accordingly, the present embodiment, the stylization of the avatar or mesh can be optimized by utilizing multimodal embedding vectors. This may mean that the neural network can be optimized by measuring similarity between multi-modal embedding vectors. For example, based on a first embedding vector that is the encoding result of a multi-modal text encoder for input prompts and a second embedding vector that is the encoding result of a multimodal image encoder for multi-view mesh images including empty images, the CLIP-Actor can calculate the similarity between multi-modal embedding vectors and optimize the neural network based on the calculated result.

Spatio-Temporal View Augmentation

As mentioned above, spatial augmentations, such as 3D viewpoint or 2D image augmentations, may improve the quality of content generation. Accordingly, CLIP-Actor may focus that a human motion has multi-view property originated from the temporal movement. To leverage the spatio-temporal context of human motion and the decoupled style field representation. CLIP-Actor may be configured to use spatio-temporal view augmentation.

Further, CLIP-Actor may be extended to spatio-temporal view augmentation, where CLIP-Actor may leverage both multi-view property and human motion originating from the temporal movement. This naturally diversifies views in a combinatorial way by the spatio-temporal context of human motion.

The strength of DNSF may be amplified with the spatio-temporal view augmentation. Because DNSF $G_0$ takes a template SMPL mesh as an input, which is pose-agnostic. Therefore, the semantic loss $L_s$ can be measured with any content mesh $M_i$, for all $i \in \{1, \ldots, T\}$ in the motion sequence for learning DNSF. One content mesh can be sampled from the center frame or the frame that conforms best with the text prompt. This increases the chance to measure the loss with a view favorable to DNSF learning. Considering that the naive selection of the content mesh fails to generate plausible color and geometric details when it does not conform with the text prompt, the content mesh sampling strategy is a crucial design choice.

As described above, the text-driven human motion recommendation system of the action avatar creation device, given a text description of a human action, may find the best semantically matching motion sequence from the motion database. The content mesh may be sampled from the multi-modal context. The decoupled neural style field takes a T-posed human mesh and learns text-based style features, which are then applied to the content mesh. By applying spatio-temporal view augmentation and weighted rendered images, neural network optimization can be guided by the similarity between the rendered image and the input text prompt.

In addition, as described above, the action avatar creation device can specify a style using the vertex color and displacement of the mesh and visualize 3D motion that fits the description of the input text. For example, consider a natural language prompt like "walking Steve Jobs wearing blue jeans." At this time, instead of preparing an additional fixed 3D mesh input, in this embodiment, a 3D mesh sequence that conforms an input prompt (eg, walking) can be obtained by searching for a motion sequence in a pre-prepared dataset. The retrieved mesh sequence becomes the "content" of the mesh stylization. In addition, by optimizing the neural network model to learn the color and displacement of mesh vertices, style properties such as clothes and hair can be given to the mesh. Lastly, the human mesh animation device of the present embodiment can generate a short clip (see 900 in FIG. 5) of Steve Jobs walking in jeans with excellent quality.

Figures 7, 8:
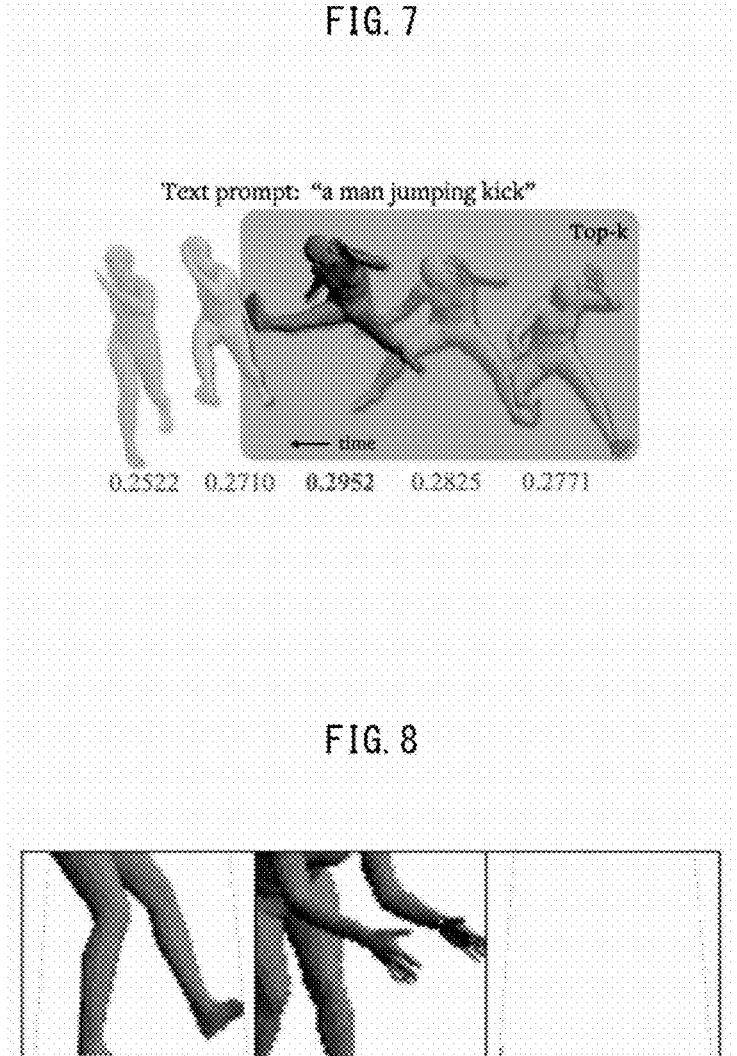
FIG. 7 is a view for describing top-k best matching mesh frames that conform with a given text prompt according to another exemplary embodiment of the present disclosure.
FIG. 8 is a view for describing a naive mean embedding of the random-cropped renders that may distract the optimization of a decoupled neural style field (DNSF) in another exemplary embodiment of the present disclosure.

FIG. 7 is a view for describing top-k best matching mesh frames that conform with a given text prompt according to another exemplary embodiment of the present disclosure.

Referring to FIG. 7, one naive way to choose the content mesh to stylize with is to randomly select a single mesh within a mesh sequence. However, as careful text prompt and its semantic alignment with the mesh's rendered image are crucial for the optimization, CLIP-Actor may design multi-modal content mesh sampling that finds the best text-conforming meshes within the motion. Specifically, CLIP-Actor may render the images of the content mesh sequence, $I(M_{1:T})$, and compute each image's CLIP similarity score with the input text prompt y.

For example, when the text prompt is given as "a man jumping kick", CLIP-Actor may render each mesh in retrieved motion into an image and find the semantically matching frames with the jumping kick action. That is, as shown in FIG. 7, CLIP-Actor may find five mesh frames that conform the given text prompt and select the three mesh frames as the top-k matching mesh frames. The similarity score of each frame is written at the bottom of each avatar.

FIG. 8 is a view for describing a naive mean embedding of the random-cropped renders that may distract the optimization of a decoupled neural style field (DNSF) in another exemplary embodiment of the present disclosure.

In the present embodiment CLIP-Actor may apply differentiable 2D image augmentations, including random crop and perspective transformations before the pre-trained CLIP encoder g(•) encodes the rendered images. Such 2D augmentations help DNSF learn style attributes from diverse perspective images, thus can achieve better generalization in 3D contents. That is, CLIP-Actor can create a multi-view mesh image using differentiable rendering and perform spatiotemporally consistent stylization using various spatial viewpoints and time frames.

However, the problem occurs when careless random crops may be applied to CLIP-Actor. Usually, extreme close-ups to crop the rendered images, which severely samples the empty renders, can be applied. Such redundant images do not conform to the text prompt even for the properly stylized meshes and distract the stable DNSF optimization.

Accordingly, CLIP-Actor may be configured to mitigate this issue by weighting the CLIP embedded vectors $g(I_{ij}^*)$ from N different camera poses $\{p_j\}_{j=1}^N$ according to each image's foreground pixel ratio. In other words, CLIP-Actor may be configured to reject the embedding vector $g(I_{ij}^*)$, if $I_{ij}^*$ has extremely small portion of mesh foreground pixels in it. It may be called as mask-weighted embedding attention. CLIP-Actor may implement it by simply adding the weight $w_{ij}$ to Equation 4 as Equation 5 below.

$$\bar{g}(I_i^*) = \sum_{j=1}^N \frac{w_{ij}}{\sum_{k=1}^N w_{ik}} g(I_{ij}^*), \qquad \text{[Equation 5]}$$

$$w_{ij} = \frac{1}{HW} \sum_{H,W} \mathbb{1}[m_{ij}(h, w) = 1]$$

In Equation 5, H and W denote the height and width of the rendered image, $m_{ij}$ refers to the foreground mask of the rendered image $I_{ij}^*$, given the specific content mesh $M_i$, stylized mesh $M_i^*$ for camera pose $p_j$.

Examples of the results of evaluating the above-mentioned CLIP-Actor from various aspects are mentioned below. Since CLIP-Actor is in an over-fitting regime and the first approach that addresses the stylization of 3D human meshes in "motion" conditioned on the natural language, technical components and the qualitative design choices may be mainly ablated in CLIP-Actor.

Figure 9:
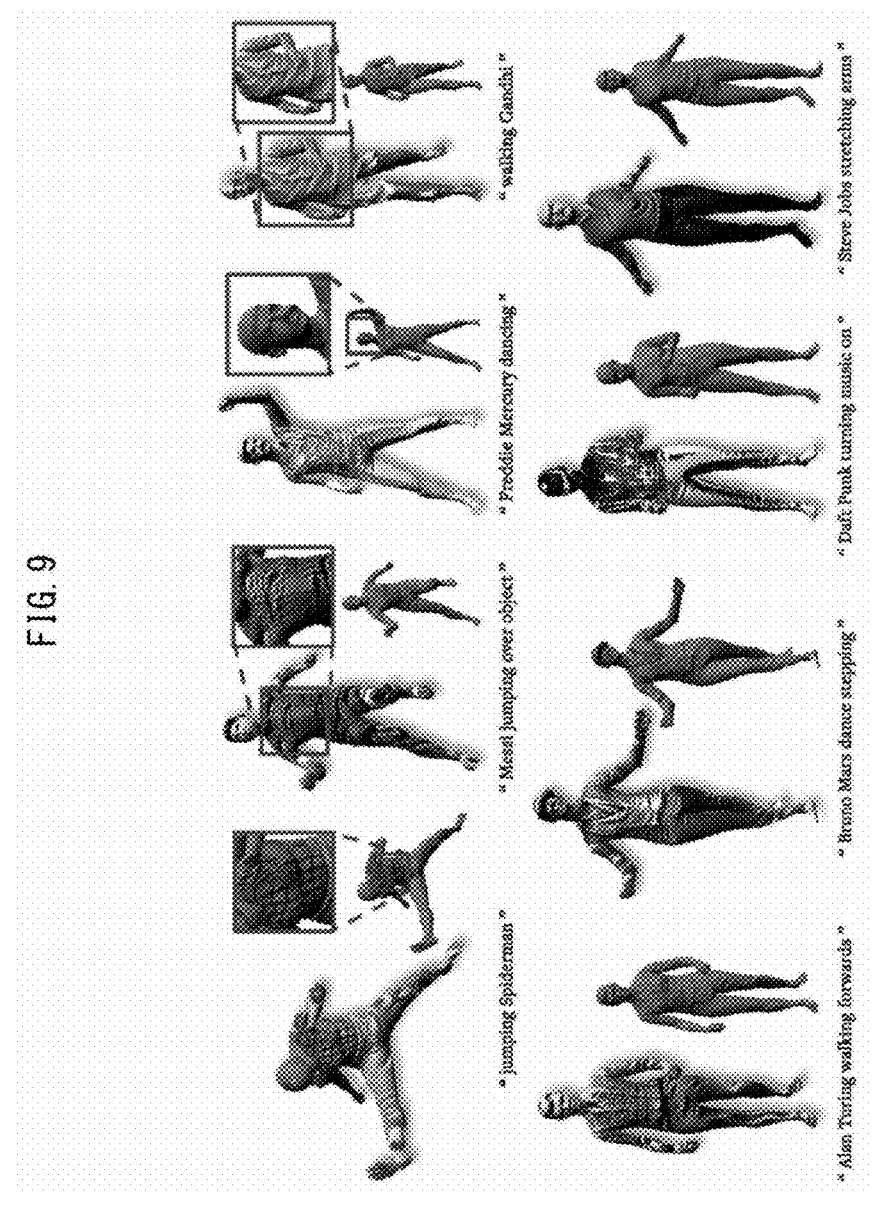
FIG. 9 is a view for describing qualitative results of CLIP-Actor.

FIG. 9 is a view for describing qualitative results of CLIP-Actor.

Referring to FIG. 9, each image shows the representative frame from the recommended motion sequence, with detailed surface geometries and textures, along with the input text prompt. CLIP-Actor shows good action and style consistency, vivid and attractive texture results.

Further, in FIG. 9, the input text prompts for each of the avatars include "jumping spiderman," "Messi jumping over object," "Freddie Mercury dancing," "walking Gandhi," "Alan Turing walking forwards," "Bruno mars dance stepping," "Daft Punk turning music on," and "Steve Jobs stretching arms."

In the present embodiment, CLIP-Actor, as the one that uses the top-3 best matching mesh frames conforming with a given text prompt, i.e., using multi-modal content mesh sampling and spatio-temporal view augmentations along with the mask-weighted embedding attention. Also, the CLIP-Actor (base) is the model that utilizes only the center frame of the retrieved motion sequence and does not utilize DNSF, i.e., using posed mesh to learn the style field. Still, a base of CLIP-Actor is a strong baseline model since it at least mitigates the limitation of existing Text2Mesh by suggesting the initial mesh to the neural optimization. Here, the limit of the existing Text2Mesh is to include issues that produce undesirable styles when a given template mesh is difficult to conform given text prompts.

Furthermore, as shown in FIG. 9, CLIP-Actor's recommendation and mesh stylization results for a given text prompt are visualized. With only a single text prompt, CLIP-Actor can retrieve visually conforming motion sequences containing representative poses. Moreover, CLIP-Actor can capture the subject's representative identities. For example, the geometric and texture details such as Spiderman's webbed costume, the iconic color of Lionel Messi's uniform, Freddie Mercury's hairstyle, and the robe that Gandhi wears can be well-illustrated as shown in FIG. 9.

FIGS. 10(a) to 10(d) are views for describing qualitative comparison among CLIP-Actors and comparative examples.

Figures 10A, 10B, 10C, 10D:
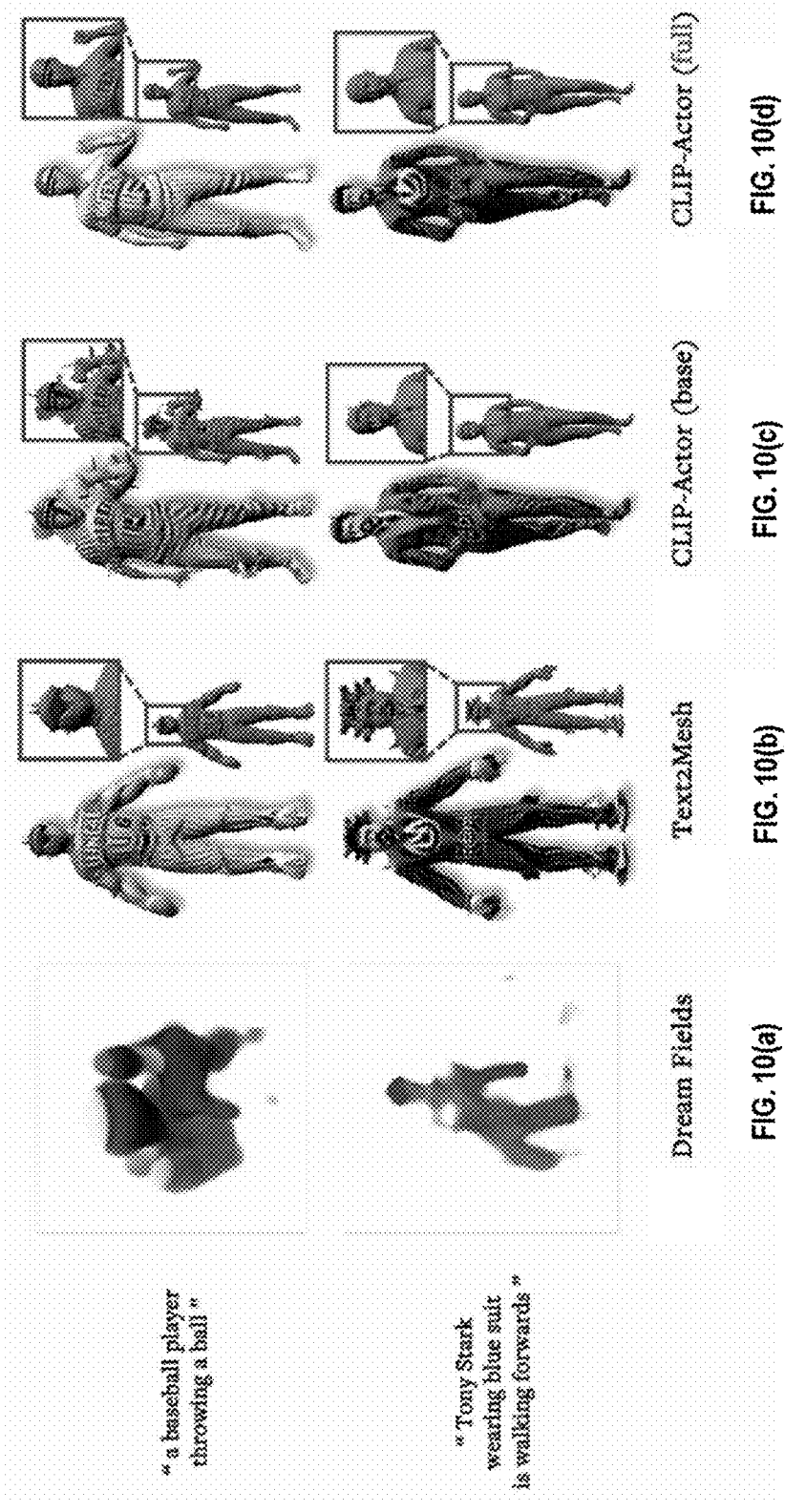
FIGS. 10(a) to 10(d) are views for describing qualitative comparison among CLIP-Actors and comparative examples.

As shown in FIGS. 10(a) to 10(d), given the same text prompts as input, FIG. 10(a) Dream Fields as a comparative example shows abstract generations, which are blurry and hard to recognize, and FIG. 10(b) Text2Mesh as another comparative example shows a better generation than Dream Fields but suffers from substantial defects on the surfaces. FIG. 10(c) CLIP-Actor (base) shows more text-conforming meshes with human-recognizable style attributes but still suffers from surface defects. FIG. 10(d) CLIP-Actor (full) as the present embodiment shows human-recognizable and semantically conforming action, while presenting detailed color and geometry, such as hairstyle and face identities. In the qualitative comparison, "a baseball player throwing a ball" and "Tony Stark wearing blue suit is walking forwards" are used as the input text prompts.

CLIP-Actor (full) is evaluated by using other recent competing methods, Dream Fields and Text2Mesh, and the strong baseline model, CLIP-Actor (base).

Given the same text prompts, Dream Fields shows blurry and non-human recognizable renderings of the generated 3D content. According to the assumption, such performance degradation is due to the lack of structural prior when training the Dream Fields. Dream Fields learns the occupancy and the color of 3D points in virtual space without any structural guidance. For example, the human body's physical constraints cannot be imposed on Dream Fields when performing specific actions. When applying only semantic supervision to such a highly unrestrained content generation process fails to handle physically constrained human motion and textures.

Text2Mesh shows enhanced texture generation than Dream Fields. However, it still fails since the given artist-designed human mesh is absolutely uncorrelated with the target human action. Such limitation is originated from Text2Mesh's highly coupled style field, which learns the style field from the "posed" content mesh. Text2Mesh also clamps the per-vertex displacement to lie in a limited range, preventing style attributes from largely changing the content. On the other hand, by adding the text-driven human motion recommendation module before Text2Mesh, and providing the text-conforming content mesh as an initial point, i.e., CLIP-Actor (base), Text2Mesh's qualitative performance can be significantly enhanced.

Finally, the full CLIP-Actor further enhances the qualitative result by capturing semantically meaningful details such as a cap on a baseball player and the hairstyle of Tony Stark (see FIG. 10(d)) while reducing the messy spikes. In the present embodiment, DNSF, multi-modal content mesh sampling, and spatio-temporal view augmentation enable CLIP-Actor to leverage multi-view renderings originating from multi-frame human motion; thus, results are much smoother and text-conforming. More importantly, all the comparative methods except CLIP-Actor cannot handle human motion. Such as CLIP-Actor may recommend text-conforming human motion and synthesize temporally consistent and pose-agnostic mesh style attributes.

The user direct evaluation results below can be referred to as one of the methods for quantitatively evaluating CLIP-Actor.

Figure 11:
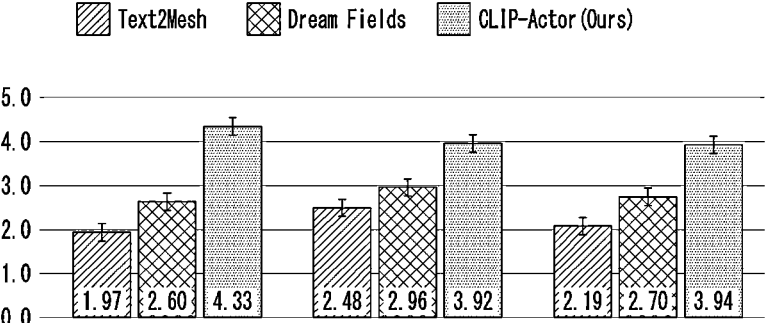
FIG. 11 is a graph illustrating user study results obtained from CLIP-Actor that outperforms other competing methods in various aspects.

FIG. 11 is a graph illustrating user study results obtained from CLIP-Actor that outperforms other competing methods in various aspects.

Referring to FIG. 11, since there are no benchmarks for task of the present embodiment, CLIP-Actor (Ours) is evaluated quantitatively by a user study. CLIP-Actor may ask 46 non-expert users to score (1-5) five random text-avatar paired results regarding motion-text consistency, stylization quality, and overall consistency with the given text.

Especially, CLIP-Actor outperforms other comparative methods, such as Text2Mesh and Dream Fields, in all aspects, while none of the competing methods scored higher than a neutral point (i.e., <3). The differences are significantly noticeable in the motion-text consistency, which validates the good action consistency.

Figure 12:
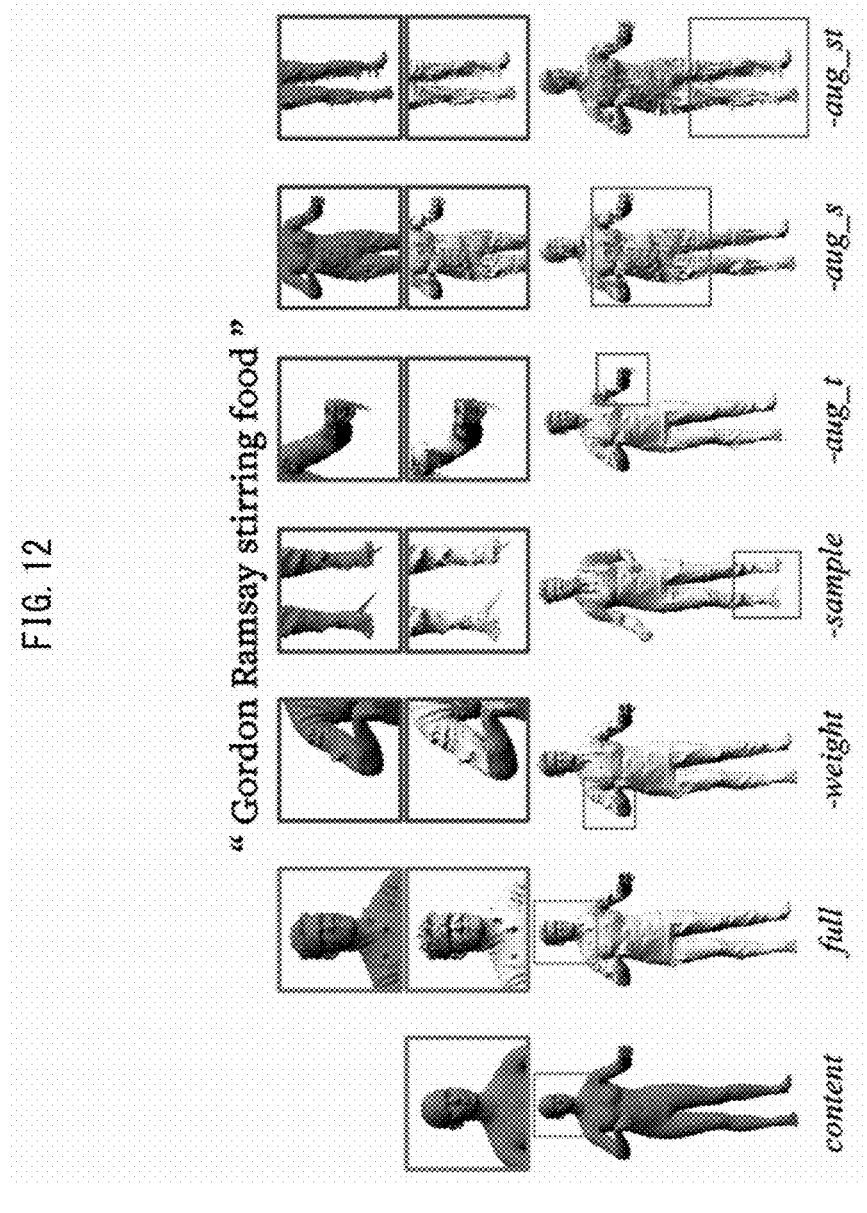
FIG. 12 is a view for describing text-driven human avatars in motion outputs by CLIP-Actors, of which some components are removed to validate corresponding effects.

FIG. 12 is a view for describing text-driven human avatars in motion outputs by CLIP-Actors, of which some components are removed to validate corresponding effects.

Referring to FIG. 12, CLIP-Actor can be analyzed by ablating each of the components of DNSF. The qualitative ablation results for the major technical components are shown. Full model of Clip-Actor shows the most smooth geometry and vivid color.

To describe the experimental process and results in more detail, first, temporal view augmentation may be removed so that DNSF utilizes only a single mesh frame (top-1). Removing the multi-frame renderings significantly degrades the visual quality, where it presents noticeable spikes on the surface and unrealistic colors (−aug_t in FIG. 12). Since CLIP-Actor utilizes top-3 relevant frames and 2D, 3D augmentations, it leverages multi-view of stylized mesh, which regularizes the model from overfitting.

Next, by multi-modal content mesh sampling, the full CLIP-Actor is compared with the model without multi-modal content mesh sampling. Multi-modal content mesh sampling enables DNSF to begin its optimization with better initialization that conforms with the text prompt. Naive sampling of the content mesh yields unrecognizable face identities, degraded texture, and geometric details (see—sample in FIG. 12).

Next, the mask-weighted embedding attention adds detailed touches to the stylized meshes. By preventing empty renderings from guiding the optimization, it enables learning fine geometric and texture details via focused gradient flow in back-propagation. When the augmented rendered images contain extreme close-ups of distal body regions, such as tiptoe or fingertips, the embedding attention method draws the DNSF's attention to the mesh foreground pixels rather than empty space with focused gradient flow.

In FIG. 12, -weight shows the result when the DNSF is trained without the attention mechanism. The full CLIP-Actor shows much smooth, fine-grained geometric details. The novel attention mechanism can be applied to not only text-driven 3D object manipulation pipelines but also differentiable rendering applications.

Figure 13:
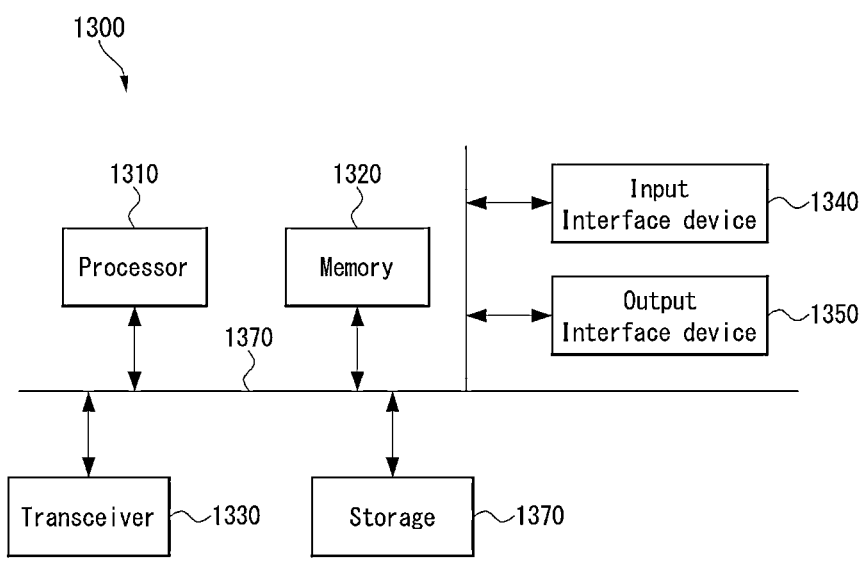
FIG. 13 is a schematic block diagram for describing a system configuration of a configuration applicable to CLIP-Actor.

FIG. 13 is a schematic block diagram for describing a system configuration of a configuration applicable to CLIP-Actor. FIG. 14 is an example diagram showing algorithm for overall pipeline of CLIP-Actor.

Referring to FIG. 13, CLIP-Actor 1300 may include at least one processor 1310, and further include a transceiver 1330 connected to a network to perform communication therewith. In addition, CLIP-Actor 1300 may further include a memory 1320, an input interface device 1340, an output interface device 1350, a storage device 1360, and the like. Each of the components provided in CLIP-Actor 1300 may communicate with each other by being connected by a bus 1370.

However, each of the components included in CLIP-Actor 1300 may be connected to the processor 1100 through an individual interface or an individual bus rather than the common bus 1370. For example, the processor 1310 may be connected to at least one of the memory 1320, the transceiver 1330, the input interface device 1340, the output interface device 1350, and the storage 1360 via a dedicated interface.

The processor 1310 may execute a program command stored in the memory 1320 and/or the storage 1360. The program command may include at least one instruction or algorithm for pipeline of CLIP-Actor. For example, the program command may include, as shown in FIG. 14, a thorough algorithm for CLIP-Actor.

The processor 1310 may refer to a central processing unit (CPU), a graphics processing unit (GPU), or a dedicated processor on which the methods according to the exemplary embodiments of the present disclosure are performed.

Each of the memory 1320 and the storage 1360 may include at least one of a volatile storage medium and a non-volatile storage medium. For example, the memory 1320 may include at least one of a read-only memory (ROM) and a random access memory (RAM).

The transceiver 1330 may include a communication interface or a sub-communication system for connection to a local area network or cable, communicating with a satellite, communicating with a mobile communication base station, and the like.

The input interface device 1340 may include at least one input device selected from a keyboard, microphone, touchpad, touchscreen, and the like, and an input signal processing part for mapping or processing a signal input through the at least one input device with the previously stored command.

The output interface device 1350 may include an output signal processing part for mapping or processing a signal output according to the control of the processor 1310 to a pre-stored signal form or level, and at least one output device for outputting a signal or information in the form of vibration, light, or the like in response to a signal of the output signal processing part. The at least one output device may include at least one selected from output devices such as a speaker, a display device, a printer, a light output device, a vibration output device, and the like.

According to the configuration described above, CLIP-Actor 1300 may create 4D human avatars with the most appropriate movement sequences for the meaning of the text prompt by utilizing a pre-trained CLIP image encoder, a text encoder, a pre-trained MPNet text encoder, SMPL Linear Blend Skinning, BABEL dataset, and SMPL template mesh.

According to the above-described embodiments, an automated system for text-driven animating human mesh can be provided. This automated system may recommend human motion sequences that best semantically match the input text prompts through a hierarchical method that leverages multimodal awareness and textual semantic matching. Also, the automated system can stylize meshes with recommended motion through optimization through synthesis in a pose-independent manner through a decoupled neural style field (DNSF). Additionally, the automated system can additionally apply new neuron optimization techniques utilizing multimodal sampling and embedding weights, thereby stabilizing and improving detailization quality and texturization quality.

Additionally, according to the above-described embodiments, the automated system for text-driven animating human mesh can be extended to other parametric mesh models such as hands and animals, enabling various animations of such 3D objects. That is, the automated system of this embodiment can be utilized in various applications to generate a dataset of motion-stylized meshes paired with a natural language description.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A text-driven motion recommendation and neural mesh stylization system comprising:

at least one instruction stored in a memory; and a processor that executes the at least one instruction, wherein the at least one instruction, when executed by the processor, causes the processor to:

find raw action labels matching a query given as a text prompt in a human motion dataset stored in a database;

encode the raw action labels and the query for vectorizing the raw action labels and the query;

measure similarity between the raw action labels and the query based on vectorized vectors to obtain content meshes;

obtain style attributes comprising color and displacement from a decoupled neural style field (DNSF) network that takes a template human mesh and learn text-driven style attributes; and apply the style attributes to the content meshes to obtain a human mesh sequence in motion.

2. The system of claim 1, wherein the at least one instruction, when executed by the processor, further causes the processor to:

select a plurality of indices of the raw action labels based on the measured similarity; and retrieve top-k action labels corresponding the plurality of indices by a top-k filter from encoded motion datasets with the raw action labels.

3. The system of claim 2, wherein the at least one instruction, when executed by the processor, further causes the processor to:

vectorize the query and the top-k action labels; and retrieve a highest-scored raw action label as a final matched result for the input text prompt.

4. The system of claim 3, wherein the at least one instruction, when executed by the processor, further causes the processor to:

find a best semantically matched motion sequence from a motion database based on the highest-scored raw action label; and sample the content meshes in multi-modal context corresponding to the best semantically matched motion sequence.

5. The system of claim 1, wherein the at least one instruction, when executed by the processor, further causes the processor to:

map the style attributes from the template human mesh and merge the style attributes mapped from the template human mesh with the content meshes by the DNSF network.

6. The system of claim 5, wherein the at least one instruction, when executed by the processor, further causes the processor to:

achieve a same mesh stylization as a basic neural style field while decoupling a style from a content mesh.

7. The system of claim 1, wherein the at least one instruction, when executed by the processor, further causes the processor to:

detailize and texturize the human mesh sequence by optimizing the DNSF network in a temporally-consistent and pose-agnostic manner.

8. The system of claim 7, wherein the at least one instruction, when executed by the processor, further causes the processor to:

compute a semantic loss between the text prompt and a text obtained by encoding the detailized and texturized human mesh sequence for optimizing the DNSF network.

9. A method for producing human mesh animation performed by a processor, the method comprising:

finding raw action labels matching a query given as a text prompt in a human motion dataset stored in a database;

encoding the raw action labels and the query for vectorizing the raw action labels and the query;

measuring similarity between the raw action labels and the query based on vectorized vectors to obtain content meshes;

obtaining style attributes comprising color and displacement from a decoupled neural style field (DNSF) network that takes a template human mesh and learn text-driven style attributes; and applying the style attributes to the content meshes to obtain a human mesh sequence in motion.

10. The method of claim 9, further comprising:

selecting a plurality of indices of the raw action labels based on the measured similarity; and retrieving top-k action labels corresponding the plurality of indices by a top-k filter from encoded motion datasets with the raw action labels.

11. The method of claim 10, further comprising:

vectorizing the query and the top-k action labels; and retrieving a highest-scored raw action label as a final matched result for the text prompt.

12. The method of claim 11, further comprising:

finding a best semantically matched motion sequence from a motion database based on the highest-scored raw action label; and sampling the content meshes in multi-modal context corresponding to the best semantically matched motion sequence.

13. The method of claim 9, further comprising:

mapping the style attributes from the template human mesh and merge the style attributes mapped from the template human mesh with the content meshes by the DNSF network.

14. The method of claim 13, further comprising:

achieving a same mesh stylization as a basic neural style field while decoupling a style from a content mesh.

15. The method of claim 9, further comprising:

detailizing and texturizing the human mesh sequence by optimizing the DNSF network in a temporally-consistent and pose-agnostic manner.

16. The method of claim 15, further comprising:

computing a semantic loss between the text prompt and a text obtained by encoding the detailized and texturized human mesh sequence for optimizing the DNSF network.

* * * * *